Inventors
EUGENE H. MYERS
EUGENE C. BRISBANE
Attorney

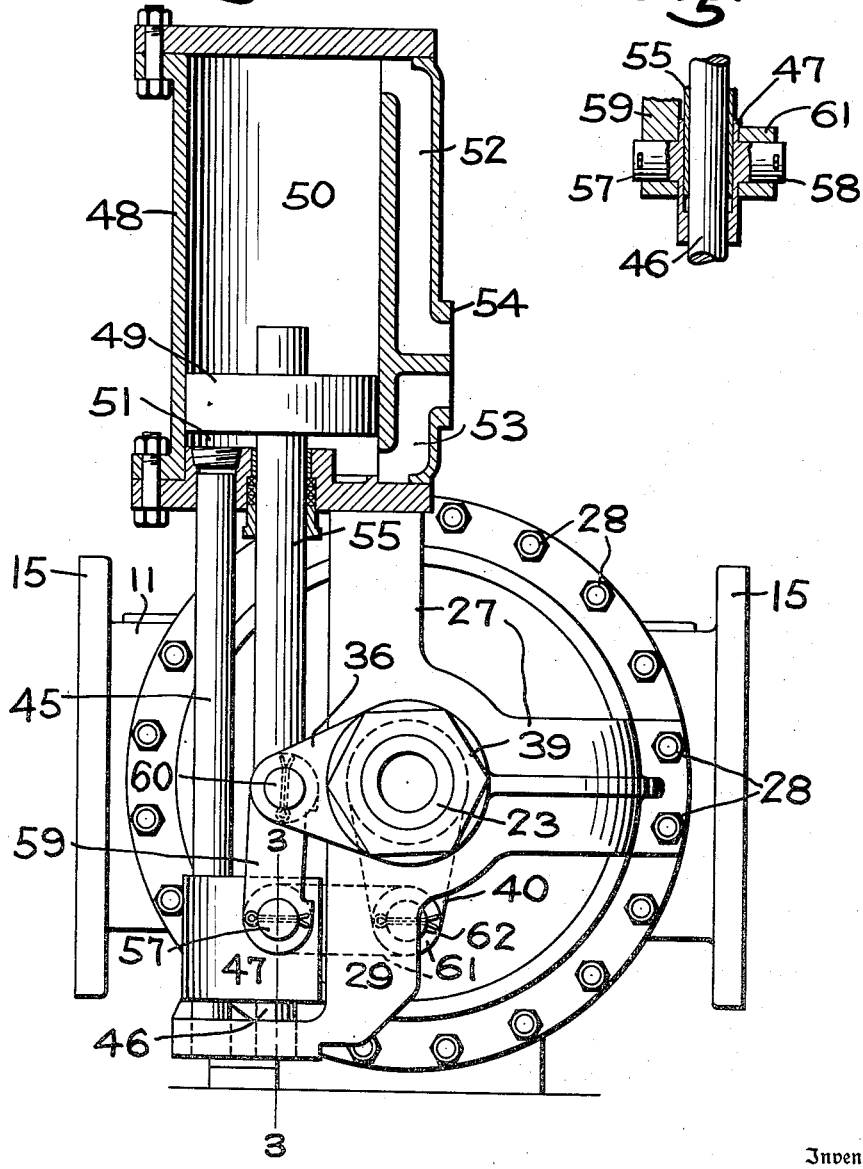

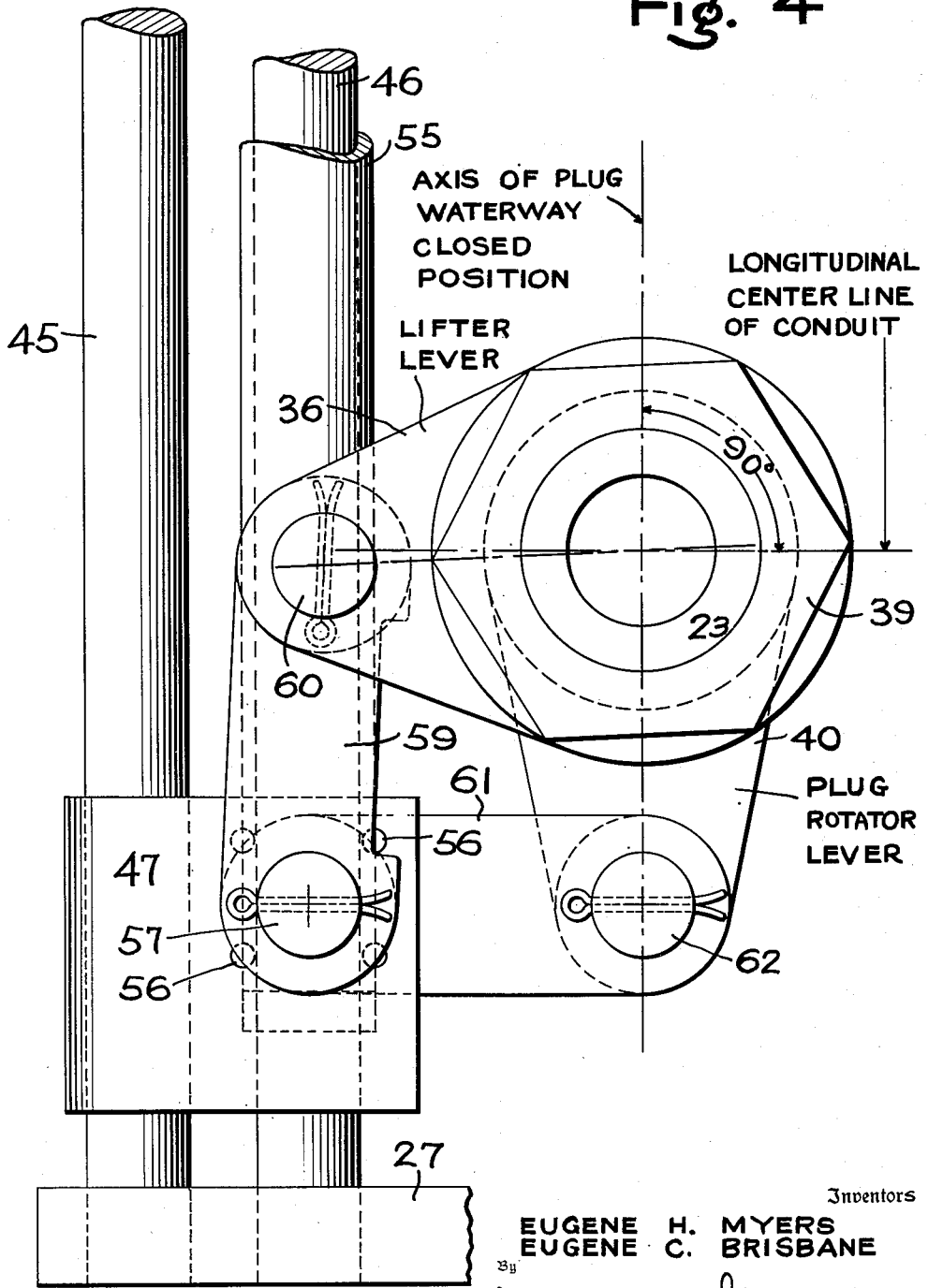

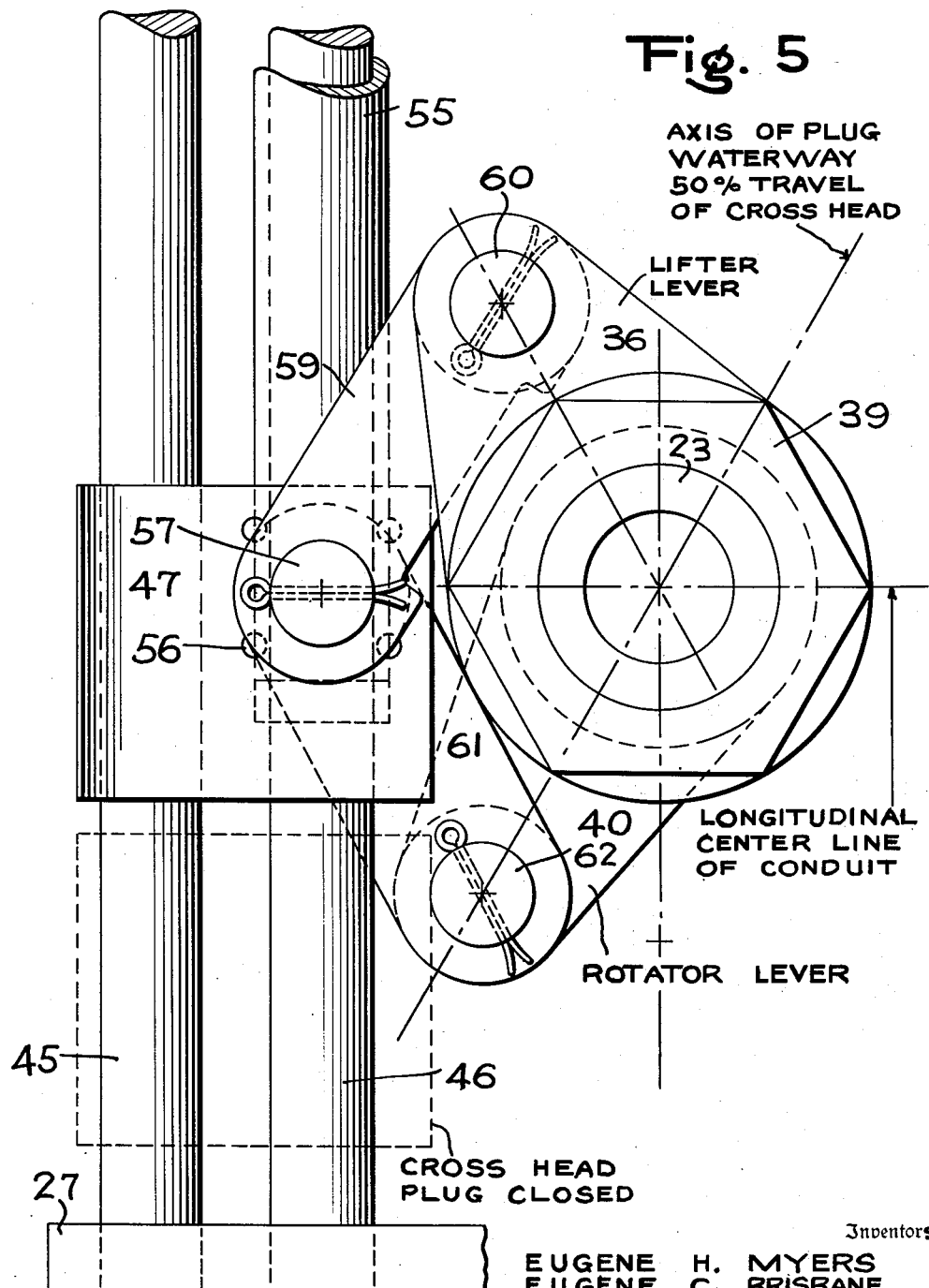

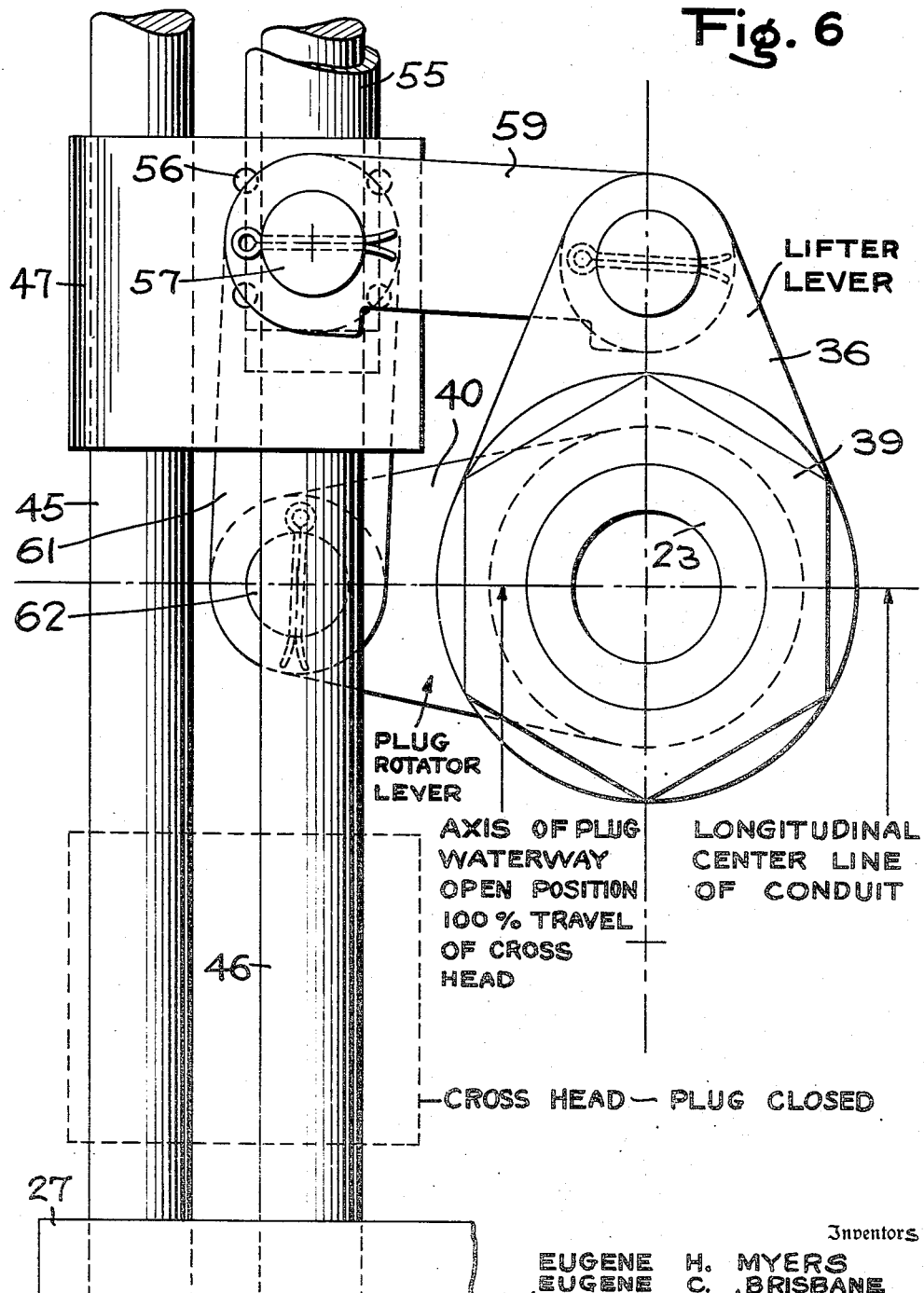

Patented Apr. 16, 1940

2,197,202

UNITED STATES PATENT OFFICE 2,197,202

VALVE MECHANISM

Eugene C. Brisbane and Eugene H. Myers, York, Pa., assignors to S. Morgan Smith Company, York, Pa., a corporation of Pennsylvania Application April 22, 1938, Serial No. 203,568

12 Claims. (Cl. 74—22)

This invention relates to plug valves. A valve of this type comprises a conical, transversely ported plug which is rotatable between open and closed positions for controlling flow through the valve. The valve plug normally rests upon a tapered seat, and, during its rotary adjustment, the plug is axially shifted into unseated position, and is restored to seated position when such adjustment has been effected. Thus, the operation of the valve includes rotation and axial movement of the conical plug. More particularly, the present invention consists in improvements in mechanism for operating a plug valve of this type.

In the accompanying drawings:

Fig. 2 is a vertical section taken on the line 2—2 of Fig. 1;

Fig. 3 is a vertical transverse section taken on the line 3—3 of Fig. 2; and

Figs. 4, 5 and 6 are diagrammatic views on an enlarged scale of the plug operating mechanism, showing the relative positions thereof from closed to open position of the plug.

Figure 1:
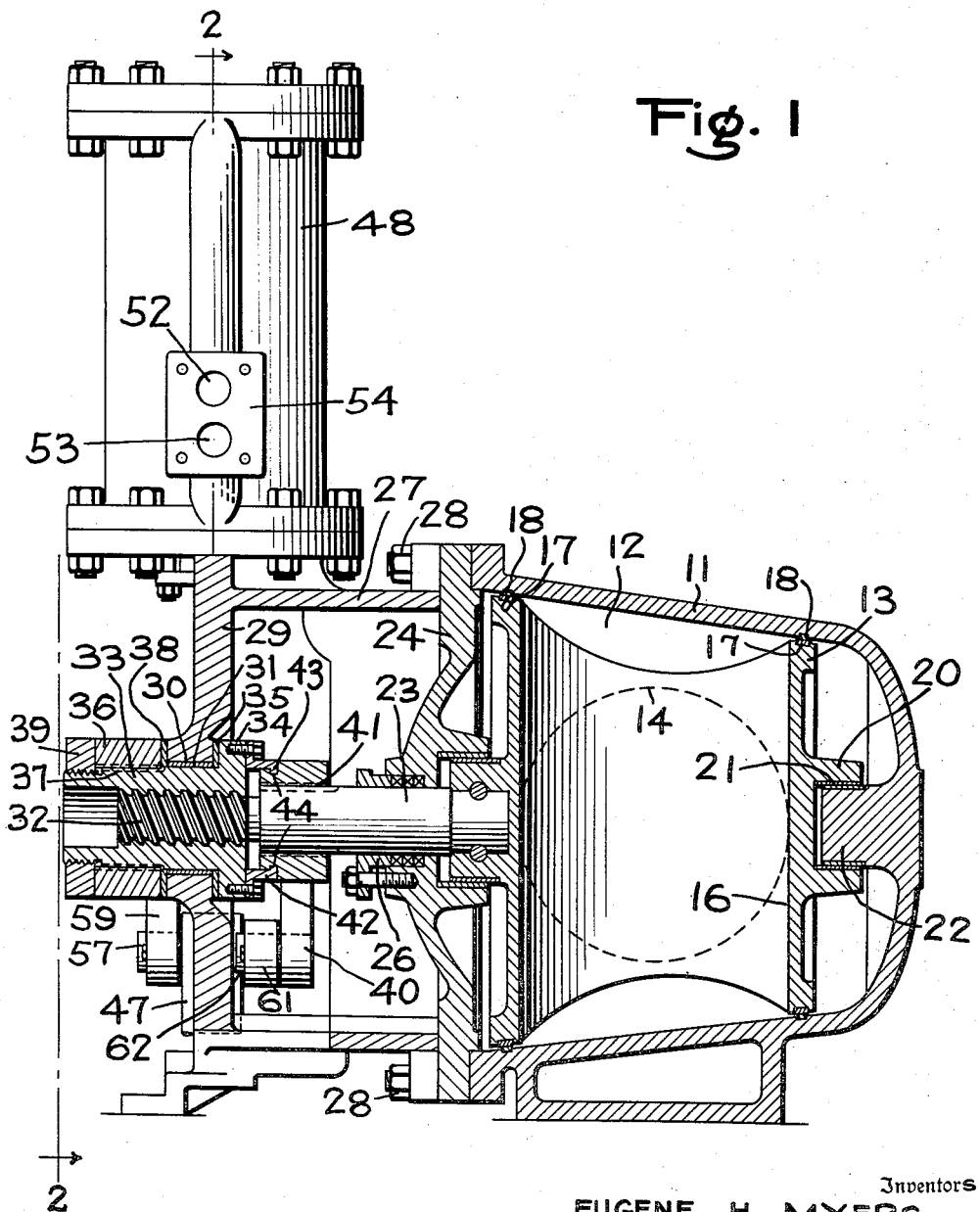
Figure 1 is a vertical section taken along the axis of the shaft of a plug valve embodying the operating mechanism of the present invention, the valve plug being shown in closed position.

Referring to the drawings, the improved valve comprises a main body or casing 11 having a cavity 12 formed therein for a tapered plug 13, the cavity 12 being intersected by a longitudinal waterway or opening 14 which constitutes a passage through the valve. The portion of the valve casing 11 in which the waterway 14 is formed may terminate in flanges 15 (see Fig. 2) by which the valve can be connected to the ends of pipes or conduits in well known manner.

The plug 13 has a passage 16 formed therein, so that when the plug 13 is in open position a bore will extend through the valve from end to end.

The valve plug 13 may have seat rings 17 which are adapted to engage seat rings 18 mounted in the body 11 so as to provide a seal between the plug 13 and the valve body when the plug is in seated position.

The plug 13 is supported for both axial and rotary movement in the valve body 11. At its inner or smaller end the plug 13 is formed with an extension 20 having a bore 21 formed therein for the reception of a stem or spindle 22 projecting inwardly from the smaller end of the valve body 11, suitable bushings being mounted on the bore 21 and spindle 22 so as to permit free rotation of the valve plug 13.

At its outer or larger end, the plug 13 has fixed thereto a shaft 23 which extends through a cover plate 24 attached to the valve body 11, the joint between the valve shaft 23 and the cover plate 24 being sealed by means of a packing gland 26, as shown in Fig. 1.

The cover plate 24 and a bracket 27 are detachably secured to the valve body 11 by bolts 28.

The bracket 27 is formed with a plurality of arms by which the bracket is supported at spaced intervals from the valve body, said bracket arms extending outwardly from the cover plate 24 a suitable distance and terminating in a thickened vertically disposed member 29 which constitutes the main support for parts of the valve mechanism, as will be hereinafter more fully described.

The portion 29 of the bracket 27 is formed with an opening 30, the center of which coincides with the axis of rotation of the plug 13. The opening 30 is fitted with a bushing 31.

The outer portion of the valve shaft 23 is formed with screw threads 32 of suitable pitch.

Mounted on the threaded portion 32 of the shaft 23 is a lift nut 33 having internal threads engaging the threads 32, as shown in Fig. 1.

The exterior of the nut 33 is formed with a smooth surface intermediate the ends of said nut, by which the nut is rotatably mounted within the bushing 31.

The inner end of the nut is formed with a flanged portion 34. Between the flanged portion of the nut and the adjacent surface of the portion 29 of the bracket 27, is a washer 35.

The nut 33 has considerable length and extends outwardly beyond the bracket 27 a suitable distance.

Mounted on the portion of the nut 33 on the outer side of the bracket 27 is a lifter lever 36 which is keyed to said nut as indicated at 37, Fig. 1. The lifter lever 36 and the nut 33 constitute a single element for imparting axial movement to the plug 13 when said lever is actuated in the manner to be hereinafter described.

Between the inner face of the lifter lever 36 and the outer surface of the portion 29 of the bracket 27, is a washer 38.

The outer portion of the lift nut 33 is formed with external threads for the reception of a thrust nut 39.

The manner in which the nut 33 is mounted on the valve shaft 23 is such that the nut 33 and the lifter lever 36 are free to turn, but lengthwise movement thereof is prevented by the washers 35 and 38 and the thrust nut 39.

Rearwardly of the lifter nut 33, the shaft 23 carries a rotator lever 40 which is keyed to said shaft, as indicated at 41, Fig. 1. The purpose of the lever 40 is to turn the valve shaft 23 so that the plug 13 is rotated from closed to open position and vice versa.

Longitudinal movement of the rotator lever 40 is prevented by a thrust collar 42, connected to the inner end of the lifter nut 33 and having an inwardly projecting flange 43 mounted in an annular groove 44 formed in the hub of the rotator lever 40. The construction is such that the nut 33 and the lever 40 can be independently rotated or turned without one imparting a corresponding rotary movement to the other, but lengthwise movement of the nut 33 with respect to the lever 40 is prevented.

In the present embodiment of the invention the plug 13 is adapted to be turned through an angle of approximately 90 degrees from closed to open position and vice versa. The valve operating mechanism is adapted to be actuated in order to impart the turning movement to the plug, and at the same time, cause the plug to move axially away from and towards its seat provided by the sealing rings 18.

The lifter lever 36 and the rotator lever 40 are, during the actuation of the plug operating mechanism, simultaneously operated by mechanism to be hereinafter described, and in order to operate said levers so that the desired movements of the plug will be effected, the lifter lever 36 is disposed with respect to the rotator lever 40 at approximately a right angle, when the valve plug 13 is in closed position. As shown in Fig. 4, in closed position of the valve plug 13, the lifter lever 36 is approximately horizontally disposed and the rotator lever 40 is vertically disposed, the rotator lever extending downwardly from the valve shaft 23 as shown in Figs. 1 and 2 and the lifter lever 36 extending laterally from said shaft in approximately a horizontal position.

Slidably mounted on a pair of spaced apart, vertically disposed rods 45 and 46, is a cross head 47.

Any suitable mechanism may be employed for actuating the cross head 47. In the present instance such mechanism is shown as comprising a power cylinder having a piston with a rod connected to the cross head in the manner hereinafter more fully described.

Supported by the bracket 27 is a cylinder 48 having a piston 49 therein. The chambers 50 and 51 on the opposite sides of the piston 49 are connected to ports 52 and 53, respectively, through which fluid under pressure is adapted to be alternately supplied for operating the piston 49. A control device or the like (not shown) is adapted to be connected to the cylinder 48 at a fitting indicated at 54, Figs. 1 and 2, for the purpose of controlling the supply of fluid to the ports 52 and 53 in well known manner.

The cross head guide rods 45 and 46 are supported by the bracket 27, the guide rod 46 being disposed in alinement with the longitudinal center line of the cylinder 48, and the rod 45 being offset with respect to the rod 46.

Depending from the piston rod 49 is a rod 55 in the form of a tube.

The guide rod 46 is mounted within the tubular piston rod 55 and the lower end of said piston rod is secured to the cross head 47 by pins 56, so that when the piston operates, the cross head 47 will also be operated.

As shown in Fig. 3, projecting from the cross head 47 is a pair of diametrically disposed cylindrical studs 57 and 58.

The outer end of the lifter lever 36 is connected to one end of a link 59 by means of a pin 60, the opposite end of said link being mounted on the stud 57.

The outer end of the rotator lever 40 is connected to one end of a link 61 by means of a pin 62, the opposite end of the link 61 being mounted on the stud 58.

As shown in Figs. 2 and 4, when the valve plug 13 is in closed position, the lifter lever 36 and the link 61, and the rotator lever 40 and the link 59 are disposed at the opposite sides, respectively, of a quadrilateral leverage structure constituting operating mechanism for the valve plug, the rotator lever being located at dead center as related to the crosshead 47.

The manner in which the plug operating mechanism functions is such that, during the movement of the cross head 47 from the valve closed to the valve open position, the relative angle between the lifter lever 36 and the rotator lever 40 increases through the first portion of the movement of the cross head and decreases during the last portion of the cross head movement, the links returning to approximately their initial relative position.

In the initial portion of the movement of the cross head, the rotator lever 40 being located on a dead center or approximately so, the angular movement of the lifter lever 36 is much greater than the angular movement of the rotator lever 40, thereby causing a relative movement between levers 36 and 40.

Therefore, since the lifter lever 36 has threaded connection with valve shaft 23, during the initial upward movement of cross head 47, the valve shaft 23 and the plug 13 are moved axially whereby the plug is unwedged, and at the same time the plug is turned slightly. This lifting or unwedging action continues during the first part of the movement of the cross head 47 and reverses during the last part of the cross head movement, during which latter period of operation the plug 13 is returned approximately to its initial axial position.

The amount of unwedging of the plug and the amount of return of the plug towards its seat in open position may be varied by changing the lengths of the levers 36 and 40, the length of the links 59 and 61, the position of the cross head pins 57 and 58, and the pitch of the screw on the valve shaft 23.

When the plug is turned from open to closed position, the operation of parts is reversed from the operation described above. As the cross head 47 reaches the end of the return movement, the rotator lever 40 arrives at dead center position, which brings the plug 13 substantially to a standstill. The lifter lever 36 now moves through its maximum angle of rotation for a unit movement of the cross head. This final lifter lever movement now gives a maximum relative movement between the two levers 36 and 40, causing rapid movement of the plug 13 axially. This results in the plug 13 being wedged tightly against the sealing rings 18, which completes the operation.

Having thus described our invention, what we claim is:

1. Actuating means for a shaft adapted to be moved in one direction a predetermined distance and then moved in the opposite direction a predetermined distance, said shaft being rotated through a predetermined angle in one direction only simultaneously during such reciprocating movements in both directions, comprising means operatively connected with said shaft for effecting reciprocating movements to the shaft, separate means operatively connected to said shaft for rotating the shaft, and means operatively connected to said shaft reciprocating means and to said shaft rotating means and movable in a straight line for actuating the same, all of said means embodying a quadrilateral leverage mechanism.

2. Actuating means for a shaft adapted to be reciprocated and simultaneously rotated, comprising a quadrilateral leverage mechanism operatively connected to the shaft and adapted to effect an axial movement to said shaft in one direction at the initiation of the turning movement of the shaft and to effect an axial movement of the shaft in the opposite direction at the completion of the turning movement of the shaft in one direction, and means movable in a straight line for operating said leverage mechanism.

3. The combination of a shaft connected to the plug of a valve, means operatively associated with said shaft to simultaneously effect axial movement and rotation of the shaft, and a quadrilateral leverage mechanism movable as a unit and connected to said shaft operating means for operating the shaft to effect a quick axial movement of the shaft in one direction with a minimum of rotation of the shaft at the initiation of the turning movement of the shaft.

4. The combination of a shaft connected to the plug of a valve, means for simultaneously reciprocating and rotating said shaft comprising a lever operatively connected to said shaft for reciprocating the shaft and a rotator lever keyed to said shaft for rotating the shaft, a single operating element for said levers, and separate links connecting both of said levers respectively to said element.

5. The combination of a shaft connected to the plug of a valve, means for simultaneously reciprocating and rotating said shaft comprising a lever operatively connected to said shaft for reciprocating the shaft and a rotator lever keyed to said shaft for rotating the shaft, a single operating element for said levers, and separate links connecting both of said levers respectively to said element, said links and said levers being arranged substantially in the form of a quadrilateral.

6. The combination of a shaft connected to the plug of a valve, means for simultaneously reciprocating and rotating said shaft comprising a lever operatively connected to the shaft for reciprocating said shaft first in one direction and then in the opposite direction during the period the plug is being rotated, a rotator lever keyed to the shaft for rotating said shaft, a single operating element for both of said levers, and links connecting said levers respectively to said element, said links and said levers being arranged so as to constitute a leverage mechanism having the shape substantially that of a quadrilateral, in which the rotator lever is actuated at a different rate than the reciprocating lever during the operating movement of said operating element.

7. Actuating means for a shaft adapted to be moved in one direction a predetermined distance and then moved in the opposite direction a predetermined distance and to be simultaneously rotated through a predetermined angle in one direction during such reciprocatory movements in opposite directions, comprising a nut having screw threaded engagement with said shaft, a lever connected to said nut by which the nut may be turned to reciprocate the shaft, a rotator lever projecting from the shaft by which said shaft may be rotated, a rectilinearly movable member and means for operating the same, a link connecting said reciprocating lever with said member, a second link connecting said rotator lever with said member, said reciprocating lever and said rotator lever link and said rotator lever and said reciprocating lever link constituting the opposite sides respectively of a quadrilateral leverage structure for operating said shaft.

8. Actuating means for a shaft adapted to be moved in one direction a predetermined distance and then moved in the opposite direction a predetermined distance, said shaft being rotated through a predetermined angle in one direction simultaneously during such reciprocating movements in both directions, comprising a reciprocating lever operatively connected to the shaft so as to impart reciprocating movements to said shaft first in one direction and then in the opposite direction, a rotator lever keyed to the shaft for rotating the shaft, a single operating element for both of said levers, and links connecting said levers respectively to said operating element, said links and said levers being arranged so as to constitute a leverage mechanism having the shape substantially that of a quadrilateral, in which the rotator lever is actuated at a different rate than the reciprocating lever during the operating movement of said operating element.

9. Actuating means for a shaft adapted to be moved rectilinearly in one direction a predetermined distance and then moved rectilinearly in the opposite direction a predetermined distance, said shaft being adapted to be rotated only in one direction simultaneously during such reciprocating movements in both directions, comprising a quadrilateral leverage mechanism connected to said shaft and adapted to effect an axial movement to the shaft in one direction at the initiation of the turning movement of the shaft and to effect an axial movement of the shaft in the opposite direction at the completion of the turning movement of the shaft in one direction.

10. Operating mechanism for a valve plug or the like having a shaft adapted for reciprocation and rotation comprising, a rotating lever secured to said shaft, a rotatable nut threadedly engaging said shaft and having a lifter lever projecting therefrom, an operating member movable in a straight line, a link connecting the free end of said rotating lever to said operating member, a second link connecting the free end of said lifter lever with said operating member, said levers and said links being arranged substantially in the form of a quadrilateral movable as a unit to cause the valve plug to first move axially in one direction a predetermined distance and then to move axially in the opposite direction a predetermined distance, and to rotate through a predetermined angle in one direction only simultaneously during such axial movements in both directions.

11. Operating mechanism for a valve plug or the like having a shaft adapted for reciprocation and rotation comprising, a lifter lever having an end threadedly engaging said shaft to move the shaft rectilinearly, a rotating lever having an end fixed to said shaft to turn the shaft, a rectilinearly operable member, a link connecting the free end of said lifter lever to said member, and a link connecting the free end of said rotating lever to said member, said levers and said links being arranged with said member for simultaneously effecting axial movement of said plug first in one direction and then in the opposite direction and rotation of said plug only in one direction during movement of said member in one direction.

12. The combination of a shaft connected to the plug of a valve or the like, a nut having threaded engagement with said shaft to move the shaft axially when the nut is turned, means for rotating the shaft, a rectilinearly operable element, a link connecting said nut with said element, another link connecting said shaft rotating means with said element, said links and the members connected thereto being arranged to effect axial movement of the shaft first in one direction and then in the opposite direction simultaneously with the rotation of said shaft in one direction during movement of said element rectilinearly in one direction.

EUGENE C. BRISBANE.
EUGENE H. MYERS.